(12) United States Patent
Demjanenko et al.

(10) Patent No.: US 6,643,270 B1
(45) Date of Patent: *Nov. 4, 2003

(54) METHOD OF COMPENSATING FOR SYSTEMIC IMPAIRMENTS IN A TELECOMMUNICATIONS NETWORK

(75) Inventors: Victor Demjanenko, Pendleton, NY (US); Frederic J. Hirzel, Sunnyvale, CA (US)

(73) Assignee: Vocal Technologies, Ltd, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/057,292

(22) Filed: Apr. 8, 1998

Related U.S. Application Data

(63) Continuation-in-part of application No. 09/033,821, filed on Mar. 3, 1998, now Pat. No. 6,327,301.

(51) Int. Cl.[7] .............................................. H04B 14/04
(52) U.S. Cl. ...................... 370/282; 370/523; 375/222; 375/242
(58) Field of Search ................................ 370/278, 282, 370/384, 385, 522, 523, 213; 375/222, 220, 242

(56) References Cited

U.S. PATENT DOCUMENTS

| | | | |
|---|---|---|---|
| 4,004,140 A | 1/1977 | Izumi et al. | |
| 4,932,061 A | 6/1990 | Kroon et al. | |
| 5,249,200 A | 9/1993 | Chen et al. | |
| 5,396,519 A | 3/1995 | Betts et al. | |
| 5,463,661 A | 10/1995 | Moran, III et al. | |
| 5,485,522 A | 1/1996 | Solve et al. | |
| 5,619,503 A | 4/1997 | Dent | |
| 5,663,982 A * | 9/1997 | Hodge et al. | 375/222 |
| 5,671,251 A | 9/1997 | Blackwell et al. | |
| 5,754,594 A | 5/1998 | Betts et al. | |
| 5,875,229 A | 2/1999 | Eyuboglu et al. | |
| 5,970,100 A | 10/1999 | Olafsson et al. | |
| 5,991,278 A * | 11/1999 | Betts | 370/276 |
| 6,072,825 A * | 6/2000 | Betts et al. | 375/222 |
| 6,185,249 B1 * | 2/2001 | Drucker et al. | 375/222 |
| 6,201,842 B1 * | 3/2001 | Kim | 375/346 |
| 6,222,890 B1 | 4/2001 | Demjanenko et al. | |
| 6,266,376 B1 * | 7/2001 | Pilozzi et al. | 375/254 |
| 6,480,549 B1 * | 11/2002 | Hirzel et al. | 375/242 |

FOREIGN PATENT DOCUMENTS

| | | |
|---|---|---|
| EP | 0 725 487 | 8/1996 |
| EP | 0 871 303 | 10/1998 |
| WO | WO 96/18261 | 6/1996 |
| WO | WO 98/13977 | 4/1998 |

OTHER PUBLICATIONS

U.S. patent application Ser. No. 09/056,331, Hirzel et al., filed Apr. 1998.

* cited by examiner

*Primary Examiner*—Min Jung

(57) ABSTRACT

Methods of determining systemic impairments in a telecommunications network comprise sending a candidate set of digital symbols from a digital modem to an analog modem. The symbols are affected by systemic impairments in the network. Data information symbols or mapping tables are derived in the analog modem. The data information symbols or mapping tables are then provided to the digital modem. The digital modem may use the data information symbols or mapping tables in a variety of manners, such as for data transmission, spectral shaping, echo cancellation, or adaptation to robbed bit signaling.

15 Claims, 9 Drawing Sheets

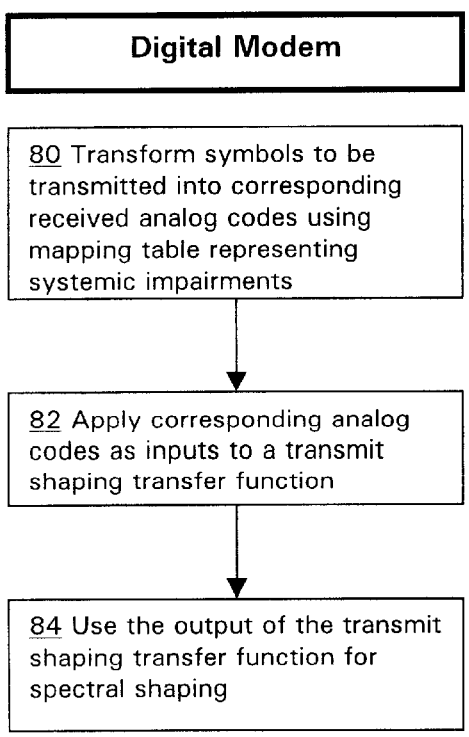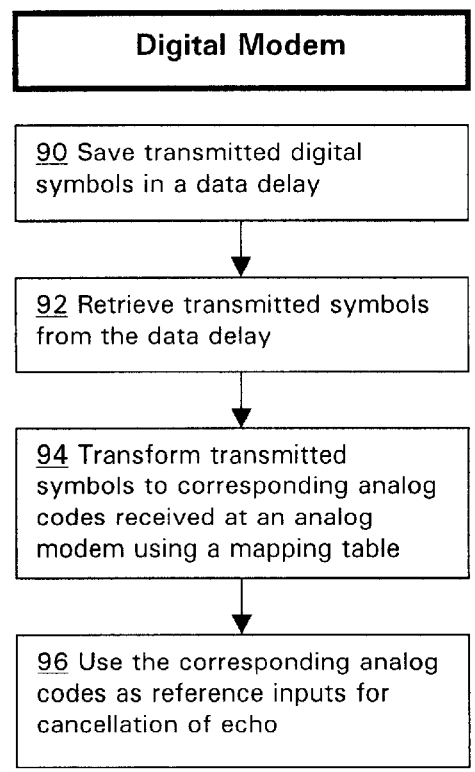
Figure 8
Figure 9

METHOD OF COMPENSATING FOR SYSTEMIC IMPAIRMENTS IN A TELECOMMUNICATIONS NETWORK

CONTINUATION DATA

This is a Continuation-in-part of U.S. patent application Ser. No. 09/033,821, filed Mar. 3, 1998, issued as U.S. Pat. No. 6,327,301 B1, entitled, "Detection and Adaptation to Digital Network Impairments by PCM Modems".

FIELD OF THE INVENTION

The present invention relates generally to modem technology, more particularly to PCM modem technology and, more particularly, to a method of compensating for systemic impairments in a telecommunications network.

BACKGROUND OF THE INVENTION

PCM modem technology as recently proposed requires that no changes need be made in the existing telecommunications system. Much attention has been paid to impairments affecting the local analog loop. However, there are several known digital impairments which can equally affect the performance of the PCM modems. The known impairments are the following:

a) Digital attenuation pads (3 dB and 6 dB)
b) Robbed bit signaling
c) PCM sample slips
d) PCM code conversions It would be impractical to require the telephone carriers to change their transmission facilities. These digital impairments can and should be accommodated by PCM modems. Each of the above-identified impairments are further discussed herebelow.

Digital Attenuation Pads

The network model diagrams for evaluation of PCM modems described in Sierra Semiconductor, "Liaison to TR30.1 concerning PCM modems", Ft. Lauderdale, Jan. 23–24, 1997, Doc. FL-08 and Intel: "Proposed Provisional PCM Modern Network Model", Ft. Lauderdale, Jan. 23–24, 1997, Doc. FL-02 show configurations with 3 and 6 dB pads within the digital transport/switching network.

FIG. 2 presents the network model of the Intel paper, which illustrates the two-wire analog to four-wire digital PCM interface. Included in the interface are the A/D and D/A converters that process input and output of the PCM modem, analog attenuation elements including IMD and RTD/AD/EDD elements, noise generators summed with transmitted signals and a balance network interface.

G. 121 further identifies additional attenuation pads used by various countries outside of North America. These pads are implemented via digital circuits or ROMs which provide a systematic remapping of PCM codes to other PCM codes. This mapping to a new space in the digital network is invariant for a telephone connection.

Robbed Bit Signaling

Robbed bit signaling is used on North American telephone trunks for interoffice signaling. The least significant bit of every sixth PCM sample is used for signaling. Within the telephone network from end-to-end, typically two PCM samples within every six may be used for signaling, although in the worst case it may be all six. The effect of this impairment is the inability to convey information in this bit position. It further may affect PCM code transformations due to attenuation pads or law conversions.

PCM Sample Slips

PCM sample slips occur for purposes of synchronization within the telephone network or between telephone networks. Either a PCM sample is completely dropped or repeated. Detection of such impairments relies on redundancy of trellis coding or forward error correction of some form.

PCM Code Conversions

PCM code conversions between $\mu$-law and A-law occur over international calls. This is a systematic mapping of codes from one law to the other. This mapping is not exactly one-to-one according to the recommendations in G.711.

Regulatory Analog Transmission Power Limits

In addition to the digital impairments, telecommunications regulatory agencies have established power limits for circuits which terminate in an analog local loop. Communications Certification Laboratory: "Liaison to T1A1.7, and TR30.1 on FCC Part 68 compliance of PCM Modems", Ft. Lauderdale, Jan. 23–24, 1997, Doc. FL-10. This limitation is a result of real implementation restrictions already within the deployed telephone equipment.

The highest data rates in the downstream direction (from the digital to the analog modem) can only be achieved if all of the $\mu$-law encoded levels can be used. However, the average energy of a sequence that uses all 255 $\mu$-law levels with equal probability is well above the maximum permitted transmit power level of –12 dBmO specified in FCC part 68.

Thus it is apparent that the need to comply with this limitation requires use of a subset of the available PCM codes in the set of PCM symbols to be used for the high speed data transmission. Non-equally probably mappings (i.e. shell mapping) could be used to alter and control the probability distribution of each of the PCM codes in the set of symbols. Even with non-equally probably mapping techniques, the analysis in RSA Communications: "$\mu$-Law Signal Power", Ft. Lauderdale, Jan. 23–24, 1997, Doc. FL-02 suggests that both the highest and lowest segments of the $\mu$-Law codes would not be used. The highest segments are eliminated because of signal power limits. The lowest are eliminated to increase the minimum distance between signal values.

What is needed, then, is a method of compensating for the above-described impairments in a telecommunications network.

SUMMARY OF THE INVENTION

Embodiments of the present invention provide a method of compensating for systemic impairments in a telecommunications network, comprising transmitting a candidate set of digital symbols from a digital modem to an analog modem, processing an analog representation of the candidate set of digital symbols by the analog modem, deriving a set of data information symbols from the analog representation of the candidate set of digital symbols, transmitting a representation of the data information symbols by the digital modem for subsequent transmission of data from the digital modem.

Further embodiments of the invention provide a method of compensating for systemic impairments in a telecommunications network, comprising sending digital symbols from a digital modem to an analog modem, converting the digital symbols into analog signals, processing the analog signals by the analog modem, training a receiver of the analog modem to recognize changes in the analog signals that correspond to known changes in digital symbols from the digital modem to the analog modem, processing an analog representation of the candidate set of digital symbols by the analog modem, deriving a set of data information symbols from the analog representation of the candidate set of digital symbols, transmitting a representation of the data information symbols from the analog modem to the digital modem, and, using the representation of the data information symbols by the digital modem for subsequent transmission of data from the digital modem.

BRIEF DESCRIPTION OF THE DRAWINGS

FIG. 8 illustrates a process in a digital modem for spectral shaping in accordance with further embodiments of the invention;

FIG. 9 illustrates a process in a digital modem for echo cancellation in accordance with further embodiments of the invention.

DETAILED DESCRIPTION OF THE PREFERRED EMBODIMENT

Detection of Digital Impairments

Figure 1:
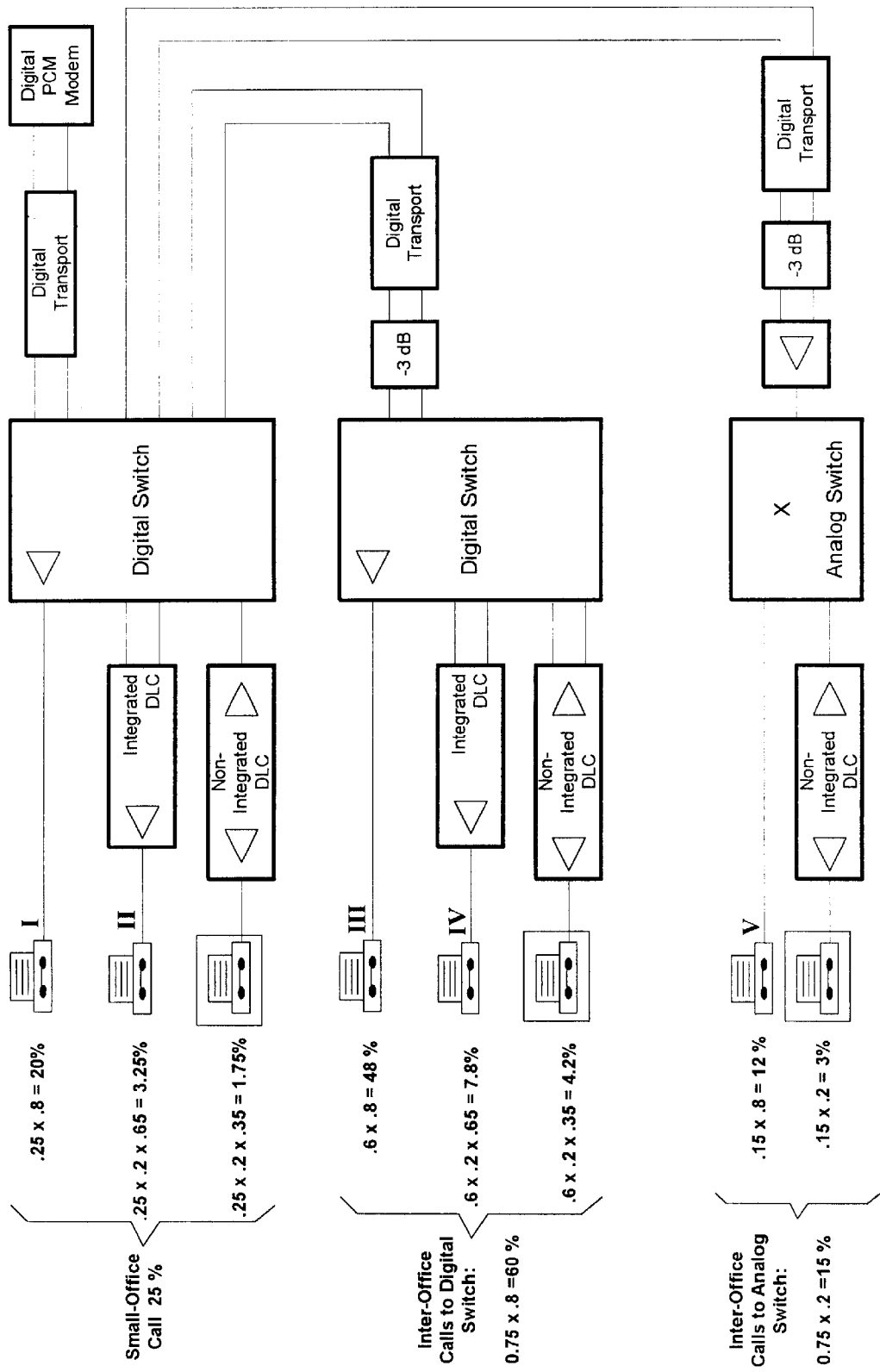
FIG. 1 is a block diagram of a network model for local PCM modem connections; the −3 dB attenuation pads shown in this Figure are illustrative only, and could be replaced, for example, by −6 dB pads, or pads having any arbitrary attenuation value or systematic mapping.
Figure 2:
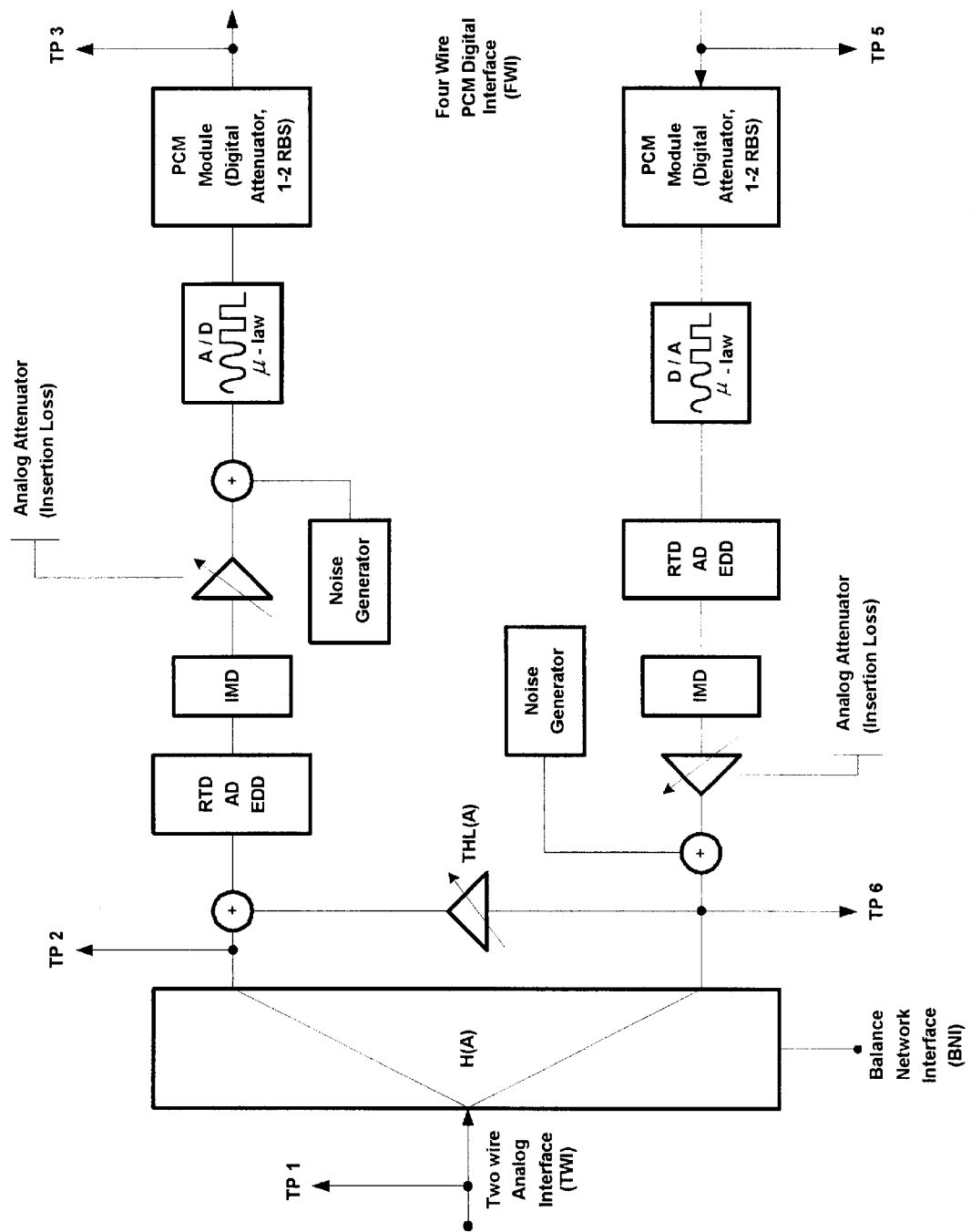
FIG. 2 is a block diagram of a network simulator configuration.
Figure 3:
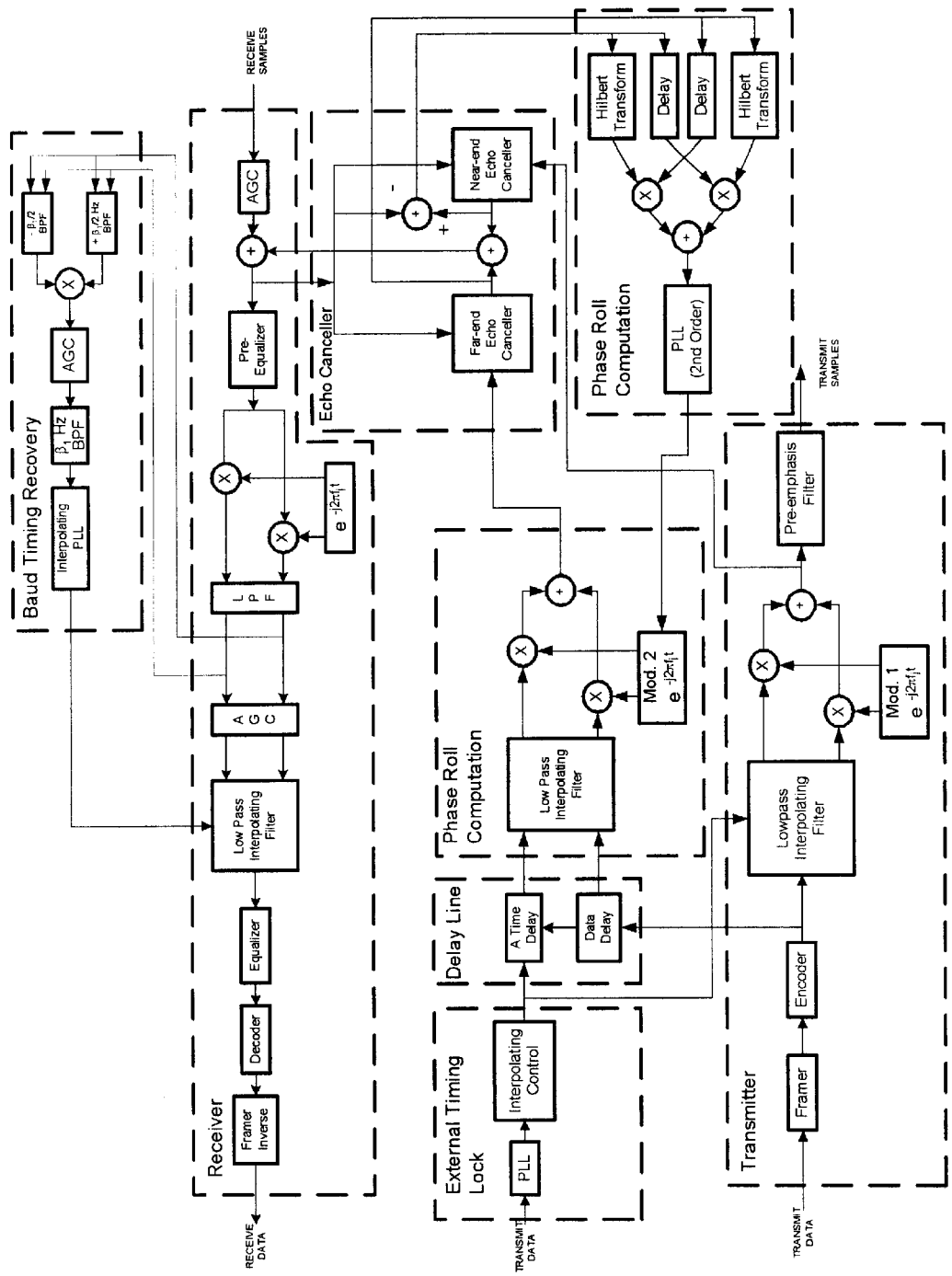
FIG. 3 is a block diagram of the processing elements used in a V.34 modem.

Embodiments of the invention provide a method of detecting the presence of attenuation pads (3 dB or 6 dB) in the analog PCM modem, a determination of an appropriate set of PCM symbols for greatest data rates and communication of the attenuation and/or the selected set of PCM symbols to the digital modem. Without selection of alternate sets of PCM symbols, the data rate would be reduced and/or more problematic to receive without error when digital attenuation is present.

PCM modems are sensitive to timing slips in two phases of its operation: training and steady state. If they occur during training they will corrupt the training process and training has to be re-initiated. Mechanisms that provide for fast recovery of training failure due to riming slips is required. PCM timing slips that occur during steady state require a resynchronization of the data stream. While detection and resynchronization may be accomplished solely by the receiver, this is problematic and complicated when trellis decoding is used. Use of two different forms of renegotiation though would provide both seamless without resynchronization and "seamed" with resynchronization. The "seamed" would only be used when PCM sample resynchronization is required. A PCM sample slip will also affect some of the other digital impairments, mainly robbed bit signaling, which will need to be re-determined.

For the detection of the other digital impairments, a training sequence at the end of Phase 3 is suggested which uses all PCM magnitude values in a mid-band frequency. Several sequences exist which will produce all valid PCM codes and whose energy content is concentrated in the center of the receive band. This sequence should be able to be received with great reliability. Use of such a sequence would allow detection of the digital network impairments.

Prior to receiving this portion of the training sequence, the analog PCM modem must have its equalizer trained and have an estimate of the S/N (without its echo canceller in operation) in the analog local loop. For all PCM magnitudes received as part of the training sequence, the receiver can then determine all PCM codes which can be uniquely received and sets of PCM codes which are indistinguishable for its observed S/N. PCM codes can be indistinguishable due to attenuation pads, robbed bit signaling and law conversions.

The training sequence may be repeated, shifted by successive numbers of samples (1 to 5), in order to uniquely identify bit positions used for robbed bit signaling. This would allow the analog modem to make a determination of the precise set of systematic PCM code mappings which are uniquely received for each of the six bit positions.

In practice, the approach of repeating for each of the possible robbed bit positions may require transmission of a fairly lengthy sequence approaching 100 msec in duration. This can be avoided in an alternative embodiment if the convention first assumes that the LSB of every PCM code is corrupted. Then once the digital modem reaches steady state, the digital PCM modem produces some known synchronizing pattern in all of the LSB's. The analog PCM modem would attempt to detect the synchronizing pattern and once detected, it could signal to the digital PCM modem via a seamless rate change the usability of the particular LSB(s) for carrying data. This mechanism would also significantly aid recovery from PCM sample slip as described earlier.

Analysis of Detection Results

Once the analog modem in a preferred embodiment has determined all PCM codes which can be uniquely received and all sets of indistinguishable systematic PCM code mappings due to attenuation pads, robbed bit signaling and law conversions, some or all of this information can be conveyed to the digital PCM modem. The digital PCM modem is then able to avoid the indistinguishable codes (or least not use different codes within the set of indistinguishable codes for conveying different information bits) and the robbed bits.

By analyzing the sets of indistinguishable PCM codes, it is possible to determine the digital telephone network attenuation. For example, Hayes Microcomputer Products, Inc., "Digital Trunk Loss", Ft. Lauderdale, Jan. 23–24, 1997, Doc. FL-07 describes a set of 32 PCM codes for 16 sets of indistinguishable codes after mapping through a 6.0206 dB attenuation pad. For a 3 dB attenuation pad, 25 sets of indistinguishable codes result after mapping. These sets of indistinguishable PCM codes, and even just a subset of these sets, can thus be a unambiguous characteristic of the 3 and 6 dB digital attenuation pads in the telephone network. A subset for either the 6 or 3 dB pads would consist of checking the indistinguishable codes corresponding to some arbitrary number of the larger characteristic indistinguishable PCM codes.

Additional analysis of the lowest level indistinguishable PCM codes will reveal those which are below the real or expected noise floor of the receiver. The receiver's estimate of S/N and knowledge of the noise contributed by its AFE and local echo canceller can be used to establish a threshold below which received PCM codes can not be distinguished. This could then be used to restrict usage of such PCM codes in the data transfer from the digital PCM modem to the analog PCM modem.

Further information regarding the processing of indistinguishable codes and determining PCM systematic transformations is included in co-pending U.S. patent application Ser. No. 09/056,331, filed on Apr. 7, 1998, and entitled, "Digital Attenuation Discovery and Pad Mapping", by Victor Demjanenko and Frederic J. Hirzel, which application is hereby incorporated by reference, and which application claims priority based on U.S. Provisional Patent Application Serial. No. 60/043,066, filed on Apr. 8, 1997, which provisional application is also hereby incorporated by reference.

Adaptation to Digital Network Attenuation

In a simple implementation, there can be three predetermined sets of PCM symbols. One for 0 dB attenuation, one for 3 dB attenuation and one for 6 dB attenuation. All of the sets of PCM symbols would have been predetermined to meet the FCC power limitations with no attenuation, 3 dB attenuation or 6 dB attenuation. Further some PCM codes could be reserved as substitutes in case some sets of additional PCM codes are indistinguishable.

Alternatively, the mapping technique (i.e. shell mapping) used for selecting codes within the predetermined PCM symbol set can apply a different distributions in the case of 0 dB, 3 dB or 6 dB attenuation. Again the power limitations can be meet for the analog local loop.

The determination of the adaptation to apply can be done by either both analog and digital PCM modems, or can be performed by one modem and communicated to the other. For simplification, in preferred embodiments, the analog PCM modem preferably determines the adaptation to be applied and communicates this to the digital PCM modem along with any other significant indistinguishable PCM codes and robbed bit position(s).

Once the digital PCM modem starts the high speed data transfer, the selected set of PCM symbols and mapper distribution would reliably be remapped to a set of PCM values that a) meet the FCC power limitations at the analog local loop, and b) can be received by the analog PCM modem and unmapped to the symbols or bit stream originally encoded by the digital PCM modem.

The transfer of downstream data would occur at higher bit rates than if a single set of PCM values and single mapper distribution was used without any compensation for the digital network attenuation.

Echo Cancellation

Modems that communicate with the central office through a two wire line must contain a two to four wire converter. Because the impedance of the two wire line is unknown the two to four wire converter will produce a near end echo. Modems, whether 2 or 4 wire, that communicate with a remote modem on a 2 wire line experience far end echo. If the remote modem also communicates to its central office through a two wire line, the remote central office for the same reasons as above will produce a far end echo. A NEAR-END CANCELER and a FAR-END CANCELER are used to cancel these near and far echoes, respectively. The cancelers model the communication channels using adaptive filters. The echo signals can then be estimated by using the delayed transmitted signals as the reference input to the adaptive filters. Echo cancellation is accomplished by subtracting the estimated echo signal from the received signals.

The DATA DELAY is used to save 1.6 seconds of transmitted signal for the FAR-END CANCELER function. The sum of the NEAR-END CANCELER output and the FAR-END CANCELER output produces the estimated echo signal. It is typical for existing PCM modems that they do not have a local 2 wire interface so that they do not experience a near end echo, and hence they may not implement a near-end echo canceler function.

A far end echo arises from a signal transversing the telephone network as opposed to a local loop. This signal experiences delay as well as digital impairments. Conventional echo cancellers only compensate for the delay. Improved echo cancelling can be achieved by modeling the digital impairments that the far end echo would experience.

Improved Spectral Shaping

The present invention also provides a method for improved spectral shaping using a transmit shaping transfer function in a telecommunications network comprising: transforming by a mapping table transmitted symbols to an analog equivalent of codes received; and, applying the analog equivalent of received codes to the transmit shaping transfer function. This method is described in more detail in U.S. Provisional Patent Application Serial No. 60/043,068, filed on Apr. 8, 1997, for an invention entitled, "A Variable Spectral Shaping Method for PCM Modems", which application is hereby incorporated by reference. This method is also described in co-pending U.S. patent application Ser. No. 09/056,455, filed on Apr. 7, 1998, now issued as U.S. Pat. No. 6,222,890 for an invention entitled, "A Variable Spectral Shaping Method for PCM Modems", by Frederic J. Hirzel and Victor Demjanenko, which application claimed priority of the aforesaid provisional application, and which nonprovisional application is hereby incorporated by reference.

The present invention provides a method for determining and adapting for various digital network impairments that are crucial for optimal PCM modem operation.

Specifically, this procedure provides a mechanism for detecting the digital network attenuation and selection; of a set of PCM symbols and/or a different mapping distribution to compensate for the detected digital network attenuation. As a result of the systematic mapping within the digital network, this adaptation can reliably conform to the FCC power limitations and can provide for the highest rates of throughput irrespective of the digital network attenuation. The adoption of this technique will allow for greater network coverage [approximately of an additional 60%] at higher data rates than would be possible with no such adjustment [approximately 25%].

Figure 6:
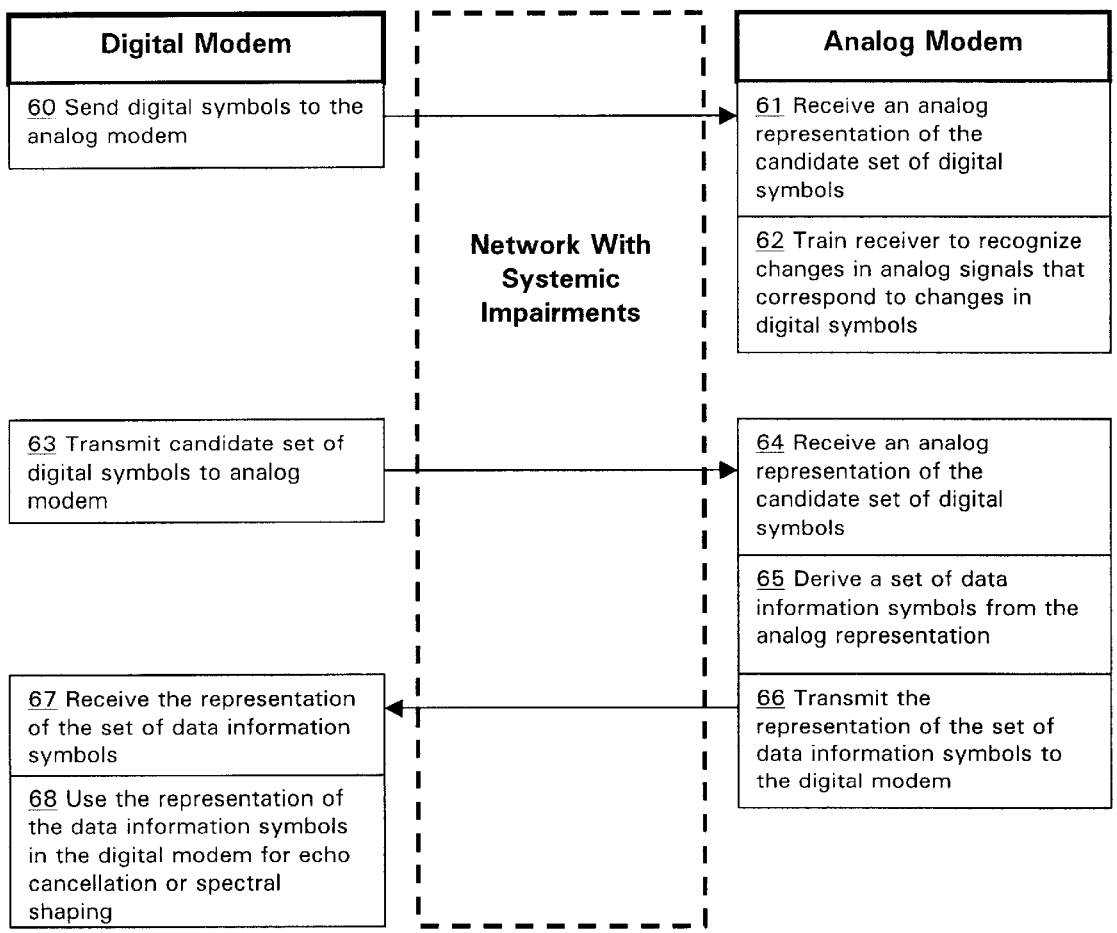
FIG. 6 illustrates processes in digital and analog modems in accordance with embodiments of the invention.

A variety of methods in accordance with embodiments of the invention may be implemented in view of the foregoing description. FIG. 6 illustrates methods in digital and analog modems in accordance with embodiments of the invention for detecting systemic impairments. Initially digital symbols are sent (60) to an analog modem. In the network the digital symbols are affected by systemic impairments and the digital symbols are converted to analog form. At the analog modem, an analog representation of the digital symbols is received (61). The analog modem receiver is then trained (62) to recognize changes in analog signals that correspond to changes in digital symbols transmitted from the digital modem. Following this training sequence, the digital modem transmits (63) a candidate set of digital symbols to the analog modem. In the network the digital symbols are affected by the systemic impairments and the digital symbols are converted to analog form. The analog modem receives (64) an analog representation of the candidate set of digital symbols. The analog modem then derives (65) a set of data information symbols from the analog representation, and transmits (66) a representation of the digital information symbols to the digital modem. The digital modem thus receives (67) the representation of the data information symbols. The digital modem may then use (68) the representation of the data information symbols, for subsequent data transmission to the analog modem, for echo cancellation or for spectral shaping.

Figure 7:
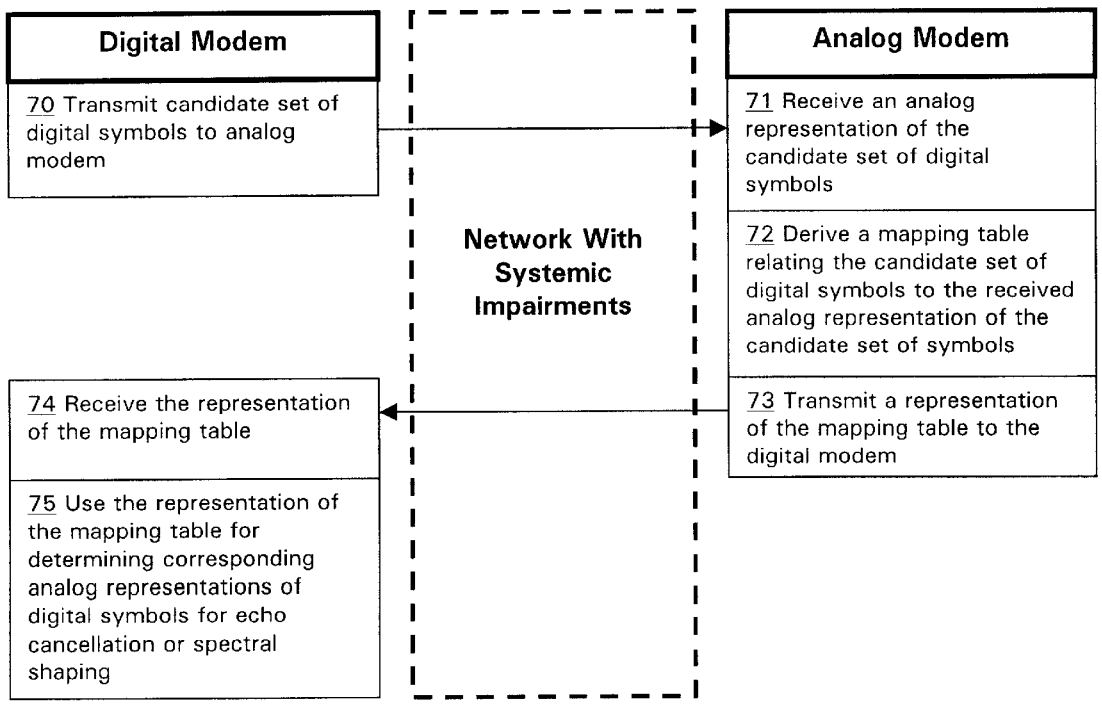
FIG. 7 illustrates processes in digital and analog modems in accordance with further embodiments of the invention.

FIG. 7 illustrates further methods in digital and analog modems in accordance with embodiments of the invention for enabling improved echo cancellation or spectral shaping in a digital modem. Initially the digital modem transmits (70) a candidate set of digital symbols to the analog modem. In the network the digital symbols are converted to analog form and the digital symbols are affected by systemic impairments. The analog modem receives (71) an analog representation of the candidate set of digital symbols. The analog modem then derives (72) a mapping table relating the candidate set of digital symbols to the received analog representation, and transmits (73) a representation of the mapping table to the digital modem. The digital modem thus receives (74) the representation of the mapping table. The digital modem may then use (75) the representation of the mapping table for echo cancellation or spectral shaping.

Figure 4:
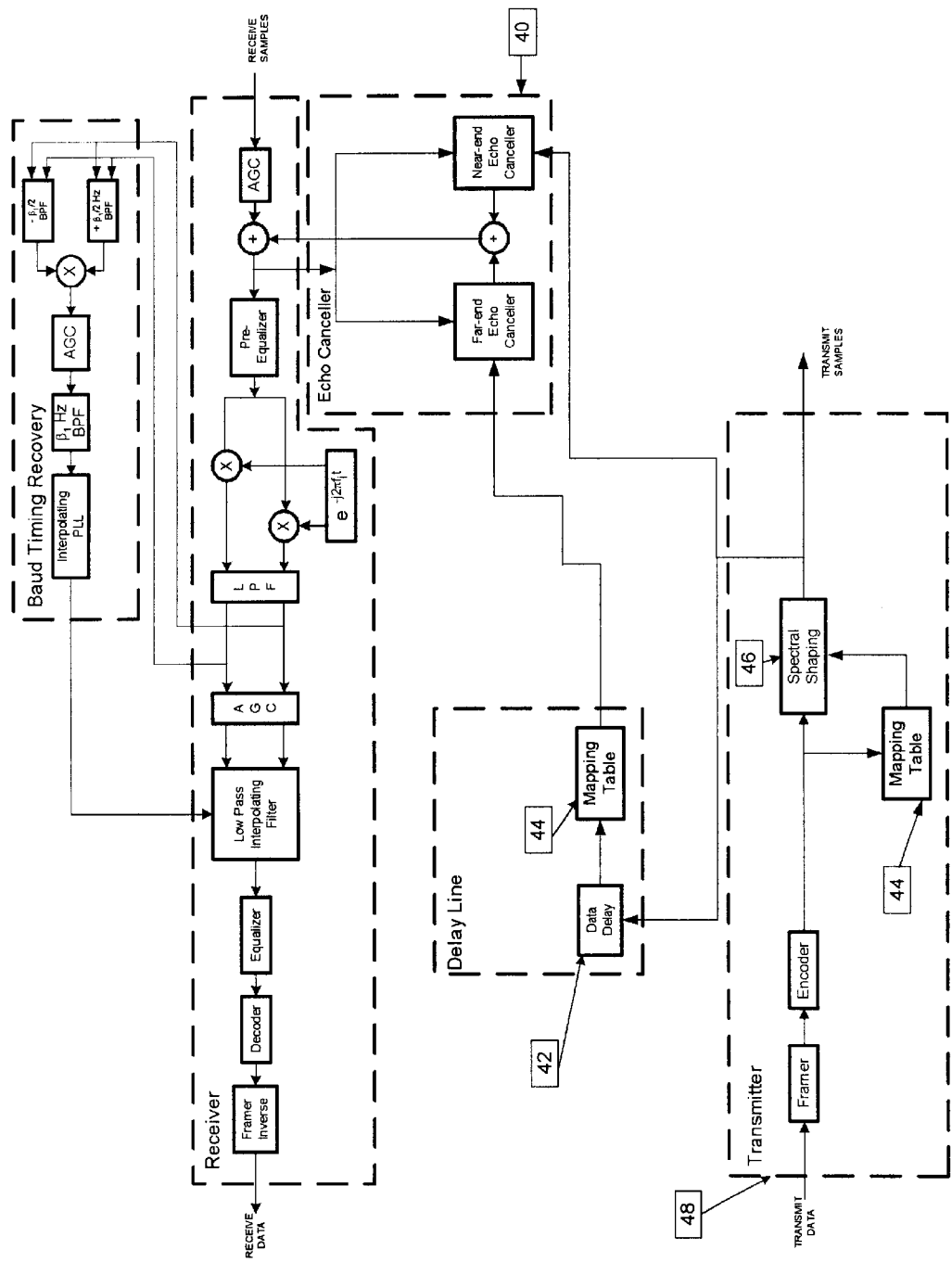
FIG. 4 is a block diagram similar to that of FIG. 3, except showing the additional processing element added when a mapping table is used in the echo cancellation process of a PCM modem.
Figure 5:
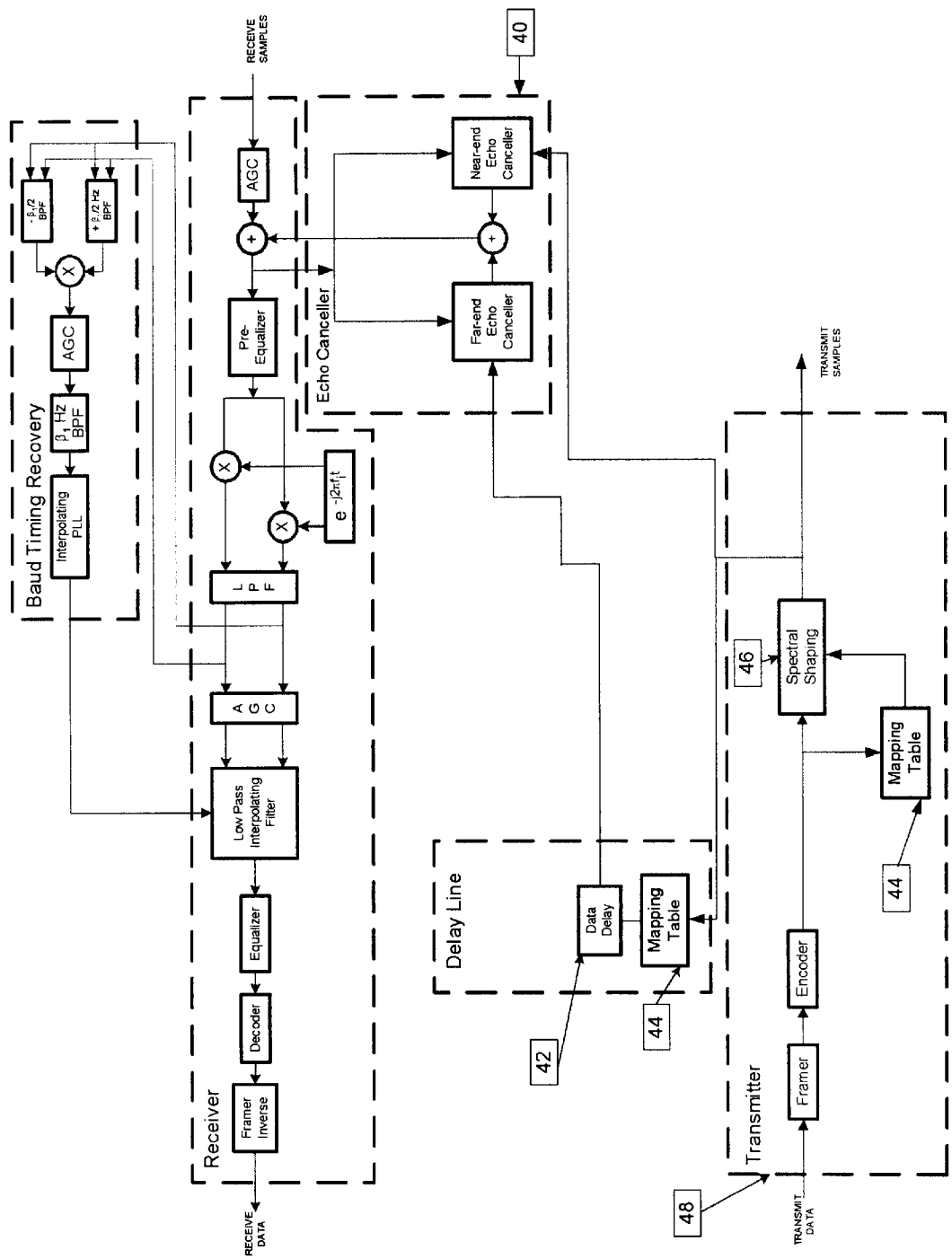
FIG. 5 is a block diagram similar to that of FIG. 4, except with the additional processing element in a different position.

FIG. 8 illustrates a further method in a digital modem in accordance with embodiments of the invention for improved spectral shaping. Initially the digital modem transforms (80) symbols to be transmitted into corresponding analog codes that will be received by an analog modem using a mapping table that represents systemic impairments. The corresponding analog codes are then applied (82) as inputs to a transmit shaping transfer function. The output of the transmit shaping transfer function is then used (84) for spectral shaping. Circuits providing the features shown in FIG. 8 are illustrated in FIGS. 4 and 5, each of which illustrates basic components of a digital modem. Each of FIGS. 4 and 5 further illustrates a mapping table 44 coupled to a spectral shaping module 46 of a transmitter of the digital modem for providing spectral shaping in the manner illustrated in FIG. 8.

FIG. 9 illustrates a further method in a digital modem in accordance with embodiments of the invention for improved echo cancellation. Initially the digital modem saves (90) transmitted digital symbols in a data delay. The transmitted symbols are subsequently retrieved (92) from the data delay. The transmitted symbols are then transformed (94) to corresponding analog codes received at an analog modem using a mapping table. The corresponding analog codes are then used (96) as reference inputs for cancellation of echo. Circuits providing the features illustrated in FIG. 9 are shown in FIGS. 4 and 5, each of which illustrates basic components of a digital modem. Each of FIGS. 4 and 5 further illustrates a data delay 42 and mapping table 44 coupled to an echo canceller 40 for providing echo cancellation in the manner illustrated in FIG. 9.

Figure 10:
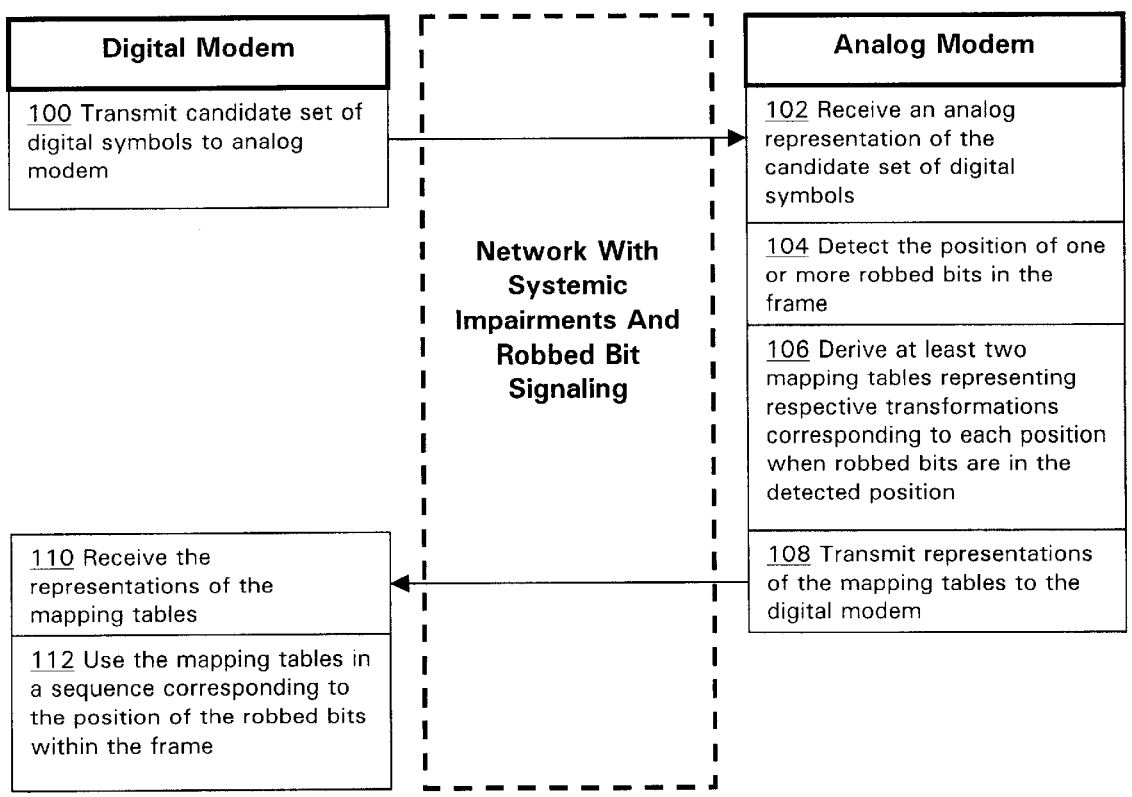
FIG. 10 illustrates a process in a digital modem for echo cancellation or spectral shaping in a system employing robbed bit signaling in accordance with further embodiments of the invention.

FIG. 10 illustrates a further method in a digital modem in accordance with embodiments of the invention for data transmission, improved echo cancellation or spectral shaping in a system employing robbed bit signaling. Initially the digital modem transmits (100) a candidate set of digital symbols to the analog modem. In the network the digital symbols are affected by systemic impairments including robbed bit signaling and the digital symbols are converted to analog form. The analog modem receives (102) a representation of the candidate set of symbols. A plurality of mapping tables are then derived (104). The mapping tables represent transformations that occur for each position in the frame when robbed bits are detected at given positions in the frame. For example, one table may represent transformations for the positions of the robbed bits, and another table may represent transformations for all other positions. Representations of the mapping tables are then transmitted (106) by the analog modem to the digital modem. The representations of the mapping tables are received (108) by the digital modem. The digital modem then selects (110) mapping tables from the plurality of mapping tables to compensate for the robbed bits.

What we claim is:

1. A method of determining systemic impairments in a telecommunications network, comprising:

transmitting a candidate set of digital symbols from a digital modem to an analog modem;

receiving an analog representation of the candidate set of digital symbols by the analog modem;

deriving a set of data information symbols from the analog representation of the candidate set of digital symbols; and, transmitting a representation of the data information symbols from the analog modem to the digital modem.

2. The method claimed in claim 1, further comprising using the representation of the data information symbols in the digital modem for subsequent transmission of data to the analog modem.

3. A method of determining systemic impairments in a telecommunications network, comprising:

sending digital symbols from a digital modem to an analog modem;

receiving an analog representation of the digital symbols in the analog modem;

training a receiver of the analog modem to recognize changes in the analog signals that correspond to known changes in digital symbols from the digital modem to the analog modem;

transmitting a candidate set of digital symbols from a digital modem to an analog modem;

receiving an analog representation of the candidate set of digital symbols by the analog modem;

deriving a set of data information symbols from the analog representation of the candidate set of digital symbols; and transmitting a representation of the data information symbols from the analog modem to the digital modem.

4. The method claimed in claim 3, further comprising using the representation of the data information symbols in the digital modem for subsequent transmission of data to the analog modem.

5. A method of determining systemic impairments in an analog modem of a telecommunications network comprising:

receiving an analog representation of a candidate set of digital symbols sent by a digital modem to said analog modem;

deriving a mapping table relating the candidate set of digital symbols to the received analog representation of the candidate set of symbols; and transmitting a representation of said mapping table from said analog modem to said digital modem.

6. A method of compensating for systemic impairments as recited in claim 5 wherein said systemic impairment is caused by digital attenuation pads.

7. A method of compensating for systemic impairments as recited in claim 5 wherein said systemic impairment comprises robbed bit signaling.

8. A method of compensating for system impairments as recited in claim 5 wherein said systemic impairment comprises PCM code conversion.

9. A method in a digital modem for improved spectral shaping using a transmit shaping transfer function comprising:

transforming, by a mapping table, symbols to be transmitted into corresponding analog codes received upon transmission of said symbols through a telecommunications network, wherein the mapping table represents transformations of transmitted symbols resulting from systemic impairments in the telecommunications network;

applying said corresponding analog codes as inputs to said transmit shaping transfer function; and performing spectral shaping using an output of the transmit shaping transfer function.

10. In a telecommunications network where PCM codes are transmitted by a digital modem and are attenuated or otherwise transformed by the telecommunications network, converted to analog signals and subsequently received by an analog modem, a method in a digital modem of compensating for robbed bits in said telecommunications network, wherein a robbed bit is defined as one or more least significant bits of said PCM code within a frame of multiple PCM codes that are used for carrying telephone system signaling information and are therefore unavailable for other use, and wherein said robbed bit may occur at any one of a number of positions within said frame, comprising:

transmitting a candidate set of digital symbols to the analog modem;

receiving a plurality of mapping tables, each of said respective mapping tables representing respective transformations resulting from systemic impairments that occur for each position within said frame when the one or more robbed bits are in given positions within said frame; and selecting mapping tables from the plurality of mapping tables, where said selection is dependent upon the position of said one or more robbed bits within said frame, to compensate for said robbed bits.

11. A method of determining systemic impairments in a digital modem of a telecommunications network comprising:

transmitting a candidate set of digital symbols from the digital modem to an analog modem; and receiving a representation of a mapping table from said analog modem, the mapping table relating the candidate set of digital symbols to an analog representation of the candidate set of symbols received by the analog modem.

12. The method claimed in claim 11, further comprising using the representation of the mapping table for determining corresponding analog representations of digital symbols for at least one of echo cancellation and spectral shaping.

13. The method claimed in claim 11, further comprising:

saving transmitted digital symbols transmitted to said analog modem for remote echo cancellation in a data delay;

retrieving said transmitted symbols from the data delay;

transforming by said mapping table said transmitted symbols to analog equivalents of codes received at said analog modem; and using said analog equivalents of codes received as a reference input for cancellation of echo.

14. The method claimed in claim 11, further comprising:

transforming by said mapping table transmitted digital symbols transmitted to said analog modem to analog equivalents of codes received at said analog modem; and using said analog equivalents of codes received as a reference input for cancellation of echo.

15. In a telecommunications network where PCM codes are transmitted by a digital modem and are attenuated or otherwise transformed by the telecommunications network, converted to analog signals and subsequently received by an analog modem, a method in an analog modem of compensating for robbed bits in said telecommunications network, wherein a robbed bit is defined as one or more least significant bits of said PCM code within a frame of multiple PCM codes that are used for carrying telephone system signaling information and are therefore unavailable for other use, and wherein said robbed bit may occur at any one of a number of positions within said frame, comprising:

receiving an analog representation of a candidate set of digital symbols transmitted by the digital modem;

deriving a plurality of mapping tables from said analog representation, each of said respective mapping tables representing respective transformations resulting from systemic impairments that occur for each position within said frame when the one or more robbed bits are in given positions within said frame; and transmitting representations of the plurality of mapping tables to the digital modem.

* * * * *